United States Patent
Sarbacher

[11] 3,798,437
[45] Mar. 19, 1974

[54] LIGHT SOURCE
[75] Inventor: Robert I. Sarbacher, Santa Monica, Calif.
[73] Assignee: John C. Bogue, Santa Monica, Calif.
[22] Filed: Aug. 11, 1972
[21] Appl. No.: 279,763

[52] U.S. Cl............................................. 240/10.6 R
[51] Int. Cl................................................. F21l 7/00
[58] Field of Search............................... 240/10.6 R

[56] References Cited
UNITED STATES PATENTS

| | | | |
|---|---|---|---|
| 2,118,996 | 5/1938 | Winckler | 240/10.6 X |
| 2,147,116 | 2/1939 | Winckler | 240/10.6 X |

Primary Examiner—Samuel S. Matthews
Assistant Examiner—Michael L. Gellner
Attorney, Agent, or Firm—Witherspoon and Lane

[57] ABSTRACT

A light source particularly adapted to provide emergency lighting and having an extremely long standby life is disclosed. The light source comprises a compartmentalized plastic tube having a light bulb in one compartment, a pair of electrodes in another compartment and an electrolyte in a third compartment. The electrolyte compartment houses an electrolyte which is stored in a frangible envelope. The plastic material which forms the first two compartments is stiff or rigid; while the plastic material surrounding the electrolyte compartment is flexible. To actuate the light source one squeezes or otherwise puts pressure on the flexible portion of the plastic tube to fracture the frangible envelope, thereby permitting the electrolyte to flow from its container and saturate the electrodes. The light bulb compartment is isolated from the electrode compartment to prevent the flow of electrolyte into the light bulb compartment. Further, the light bulb compartment may be detachable. In order to prevent accidental fracture of the electrolyte envelope, the flexible portion of the plastic tube may be covered by a removable thin metallic or plastic shroud.

3 Claims, 6 Drawing Figures

PATENTED MAR 19 1974 3,798,437

3,798,437

LIGHT SOURCE

BACKGROUND OF THE INVENTION

This invention relates to light sources; and more particularly, to light sources that have an extremely long standby life and are particularly adapted to provide emergency lighting.

There are many applications of lighting where a flame is highly undesirable and where ordinary flashlights and battery powered lanterns may be found wanting. For example, in emergency lighting a flame may be highly undesirable depending upon the circumstances and the ordinary flashlights and battery powered lanterns may be found inoperative because the shelf life of the energy source has been exceeded. In the case of flashlights or battery powered lanterns a routine maintenance schedule can, of course, be maintained so that the condition of the energy source is periodically checked. Further, flashlights having rechargeable batteries are now available on the market and these devices can be kept on charge by plugging them into a conventional AC outlet until the flashlight is needed. However, in all these prior art situations, the lighting source cannot be stored and forgotten until needed. Either a routine maintenance check has to be established or the light source must remain on charge. In some instances a charging source may not be available and the shelf life of the rechargeable energy source may be exceeded before a charging source is available. Thus, even though the flashlight is provided with a rechargeable energy source, the light may not be operative when needed because the shelf life of the energy source has been exceeded before the charging source became available.

This invention overcomes most of the problems of the prior art emergency lighting sources. The light source of this invention can be stored almost any where and forgotten until needed. When needed, the light source is activated and will provide light until its energy source has been expended. Thereafter, the light source is merely thrown away and a new light source is activated.

SUMMARY OF THE INVENTION

The light source of this invention comprises a compartmentalized tube made of plastic or other suitable material. The tube contains three compartments. The first compartment houses a light bulb; the second compartment houses a battery minus the electrolyte; and the third compartment houses the electrolyte. The electrolyte housed in the third compartment is enclosed in a frangible envelope. The portion of the tube containing the first and second compartments is made of a rigid material, while the portion of the tube housing the electrolyte is made of a flexible material. The light source is activated by squeezing the flexible portion of the tube and, thereby, breaking the frangible envelope containing the electrolyte. When the frangible envelope is broken, the electrolyte flows into the second compartment of the tube which houses the battery electrodes. When the battery is activated, the light bulb is turned on. A baffle separates the compartment containing the light bulb and the compartment containing the battery electrodes so as to prevent the flow of electrolyte into the light bulb compartment. The light bulb can be directly wired to the battery electrodes or a base can be provided so that the light bulb can be replaced or reused with another light source. By using detachable light bulbs, the tube containing only the battery and the electrolyte could be used as a replacement. However, in most instances it will be more convenient just to replace the entire light source without worrying about replacing light bulbs. Further, the savings obtained by using replaceable light bulbs would not be that significant.

Two different sizes of light sources are disclosed. Both of the disclosed light sources are miniature light sources. In one embodiment the light sources are of such size that approximately a dozen will fit into a container the size of a conventional cigarette pack. In the second embodiment the size of the light source is such that ten or so will fit into a conventional bookmatch cover. In both embodiments a protective sleeve is provided to prevent accidental breaking of the electrolyte envelope.

A box of the light sources approximately the size of the cigarette pack or a plurality of the light sources mounted in a matchbook type cover can be conveniently stored almost anywhere and then forgotten until needed. For example, a container of the light sources can be placed in a glove compartment of an automobile, on a shelf in one's house, or in any convenient place on a boat, or can be carried on the person, or for that matter can be stored almost anywhere for later retrieval. The shelf life of the battery is for all practical purposes indefinite since the battery is not activated until the light source is needed. Therefore, the light source should always be available when needed. No routine maintenance or other checks of the light sources should be necessary.

BRIEF DESCRIPTION OF THE DRAWING

A complete understanding of this invention can be obtained from the following detailed description when read in conjunction with the annexed drawing, in which.

DESCRIPTION OF THE INVENTION

Figure 1:
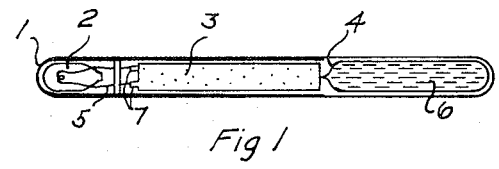
FIG. 1 shows a light source constructed in accordance with this invention.

As shown in FIG. 1, the light source of this invention is housed in a compartmentalized plastic container 1. The first compartment contains a light bulb 2; the second compartment contains a battery electrode plate assembly 3; and the third compartment contains an envelope 4 which houses the electrolyte 6. The end of plastic container 1, that is adjacent light bulb 2, is made of a transparent plastic. This transparent plastic can be just a section of plastic integrally formed with the remainder of container 1 or it can be a plastic lens integrally formed or suitably attached to plastic container 1. Of course, a glass lens could also be secured to plastic container 1 at this end. The balance of container 1 that houses light bulb 2 and battery electrode assembly 3 is made of any suitable ridgid plastic material. For reasons that will become apparent later, the end of container 1 that houses frangible envelope 4 and its electrolyte 6 is made of a flexible plastic material, again integrally formed with the remainder of container 1.

Light bulb 2 is shown as being directly wired to the electrodes of battery assembly 3. Instead of this direct connection, a standard light bulb socket could be provided so that light bulb 2 could be readily replaced. In addition, although not shown, a reflector similar to reflectors used in conventional flashlights could also be provided in this compartment of container 1.

As long as electrolyte 6 remains encased in envelope 4, the battery assembly 3 is inactive and, therefore, the light bulb remains extinguished. In order to turn on bulb 2, one merely squeezes the flexible end of container 1. This action breaks frangible envelope 4 and, thus, permits electrolyte 6 to flow into battery assembly 3. When the battery assembly 3 is activated, light bulb 2 turns on. The light bulb will remain lit until the now active battery is exhausted. At that time, the entire assembly can be thrown away and if light is still needed, a fresh light source can be activated as above.

A baffle 5 is provided between light bulb 2 and the battery electrode assembly 3 to prevent the flow of electrolyte 6 until the compartment containing light bulb 2 when the light source is activated.

Figure 2:
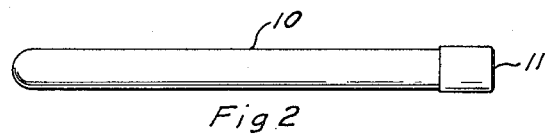
FIG. 2 shows the light source of FIG. 1 encased in a protective sheath.

Since the end of plastic container 1 that houses electrolyte 6 is flexible, the danger exists that the light source could be accidentally activated. In order to prevent the accidental activation of the light source, it can be stored in a stiff plastic or thin aluminum container 10, such as shown in FIG. 2. The sheath of container 10 is provided with a cap 11.

Figure 3:
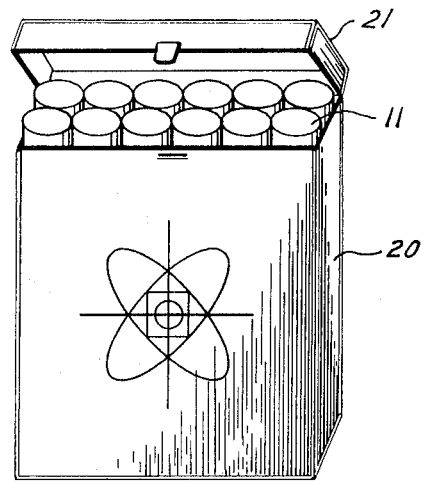
FIG. 3 shows a plurality of the light sources of FIG. 1 housed in a container.

While there is no limit other than a practical limit to the size of a light source constructed in accordance with this invention, the light sources of this invention are primarily intended to be used as emergency light sources which can be readily stored for emergency use. Therefore, it is intended that the light sources be miniature light sources and of such size that a plurality of them can be housed in a small container. Such a container 20 is shown in FIG. 3. As shown in FIG. 3, a plurality of the containers 10 of FIG. 2, each housing a light source of FIG. 1, are stored inside container 20. A lid 21 is provided to close the container. The light sources so stored can be placed in a convenient location and forgotten until needed.

Figure 4:
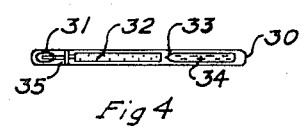
FIG. 4 shows a second embodiment of a light source constructed in accordance with this invention.

FIG. 4 shows a light source similar to the light source of FIG. 1 but of a much smaller size. Again, a compartmentalized plastic container is utilized. The plastic container 30 contains a light bulb 31 in one compartment, an electrode assembly 2 in a second compartment and a frangible envelope 33 which hold an electrolyte 34 in a third compartment. Plastic container 30 is made of a rigid plastic except for the area which surrounds the electrolyte compartment. This portion of plastic container 30 is made of a flexible plastic so that frangible envelope 30 can be broken by squeezing the container to thereby activate the light source. As was the case with the light source of FIG. 1, the end of container 30 that is adjacent light bulb 31 is made of transparent plastic or a plastic or glass lens can be provided. A baffle 35 is provided between the light bulb compartment and the battery electrode compartment to prevent the flow of electrolyte 34 into the light bulb compartment. The light source of FIG. 4 is, of course, activated by the same manner that the light source of FIG. 1 is activated.

Figure 5:
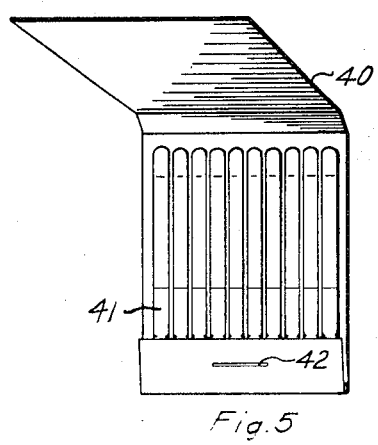
FIG. 5 shows a plurality of light sources of the type shown in FIG. 4 housed in a bookmatch type cover.
Figure 6:
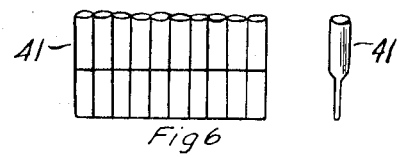
FIG. 6 shows the type of protective sleeve used with the light source of FIG. 4.

The light source of FIG. 4 is designed to be of such size that a plurality of such sources can be stored in a paper or plastic case 40, as shown in FIG. 5. Case 40 is similar to that used to contain paper matches. A plurality of stiff plastic or thin aluminum protective sheaths are secured to case 40 by means of the clip 42. The protective sheaths 41 are shown in more detail in FIG. 6. As is apparent from FIG. 6, protective sheaths 41 are not as long as plastic container 30. Protective sheaths 41 are made just long enough to protect the flexible portion of container 30 of the light source of FIG. 4. Thus, after the protective sheaths 41 are affixed to cover 40 by means of clip 42, a light source of FIG. 4 is slipped into the sheath such that the flexible portion of container 30 is protected by this sheath. In this way, the light sources are protected from accidental activation.

From the foregoing description, it should be apparent that this invention provides an emergency light source that can be readily stored in any convenient place and, in addition, provides an emergency light source that has for all practical purposes an infinite shelf life. Also, it should be apparent that one does not have to periodically check the light sources of this invention to see if they are operative, nor is a routine maintenance schedule necessary to keep the light sources in operative condition. A plurality of light sources constructed in accordance with this invention can be stored in almost any place where an emergency light source may be needed and should, unless physically damaged, always provide a source of light when needed. Further, the light source can be made of such a size that a plurality of such sources can be conveniently carried by a person at all times and, thus, provide an emergency light source no matter where one happens to be at the time when such a light is needed.

While the invention has been described with reference to specific embodiments, it will be apparent to those skilled in the art that various changes and modifications can be made to the embodiments described without department from the spirit and scope of the invention as set forth in the appended claims.

What is claimed is:
1. A light source comprising:
 a. an electrically non-conductive compartmentalized container having first, second and third longitudinally aligned compartments, said container being rigid in the area of said first and second compartments and flexible in the area of said third compartment, said container in the area of said third compartment being of such flexibility that the wall structure in the area of said third compartment can be collapsed inwardly by fingertip squeezing;
 b. a light bulb located in said first compartment, said first compartment forming one end of said container and being transparent at least at its extremity;
 c. an anode electrode and cathode electrode located within said second compartment of said container;
 d. means to directly connect said anode and cathode electrodes to said light bulb;

e. frangible envelope containing electrolyte located within said third compartment of said container, said third compartment forming the other end of said container and said frangible envelope being constructed of such material that it will break to release the electrolyte contained therein to thereby energize said light bulb by said fingertip squeezing of said container in the area of said third compartment; and f. a removable rigid protective sheath covering at least the flexible third compartment area of said container to prevent accidental breakage of said frangible envelope, said protective sheath being removed before said container in the area of said third compartment is squeezed to energize said light bulb.

2. A light source as defined in claim 1 wherein said container is of such size that a plurality of said light sources, each provided with said protective sheath, can be stored in a container of substantially the same size as a cigarette package.

3. A light source as defined in claim 1 wherein said container is of such size that a plurality of said light sources, each provided with said protective sheath, can be stored in a cover similar in size and design to a paper matchbook cover.

* * * * *